(12) United States Patent
Protter et al.

(10) Patent No.: US 11,262,837 B2
(45) Date of Patent: Mar. 1, 2022

(54) DUAL-PRECISION SENSOR SYSTEM USING HIGH-PRECISION SENSOR DATA TO TRAIN LOW-PRECISION SENSOR DATA FOR OBJECT LOCALIZATION IN A VIRTUAL ENVIRONMENT

(71) Applicant: Alibaba Technology (Israel) Ltd., Herzliya (IL)

(72) Inventors: Matan Protter, Kiryat Ono (IL); Efrat Rotem, Haifa (IL)

(73) Assignee: ALIBABA TECHNOLOGY (ISRAEL) LTD., Herzliya (IL)

( * ) Notice: Subject to any disclaimer, the term of this patent is extended or adjusted under 35 U.S.C. 154(b) by 0 days.

(21) Appl. No.: 16/640,641

(22) PCT Filed: Aug. 20, 2018

(86) PCT No.: PCT/IL2018/050915
§ 371 (c)(1),
(2) Date: Feb. 20, 2020

(87) PCT Pub. No.: WO2019/038757
PCT Pub. Date: Feb. 28, 2019

(65) Prior Publication Data
US 2021/0004075 A1 Jan. 7, 2021

Related U.S. Application Data

(60) Provisional application No. 62/548,249, filed on Aug. 21, 2017.

(51) Int. Cl.
*G09G 5/00* (2006.01)
*G06F 3/01* (2006.01)
(Continued)

(52) U.S. Cl.
CPC .............. *G06F 3/011* (2013.01); *G01P 13/00* (2013.01); *G06N 3/08* (2013.01); *G06N 20/00* (2019.01)

(58) Field of Classification Search
USPC .......................................... 345/156, 173, 174
See application file for complete search history.

(56) References Cited

U.S. PATENT DOCUMENTS

2013/0104622 A1 5/2013 Swanson et al.
2016/0187961 A1* 6/2016 Elibol .................... G06F 9/461
713/323

(Continued)

*Primary Examiner* — Thuy N Pardo
(74) *Attorney, Agent, or Firm* — Pearl Cohen Zedek Latzer Baratz LLP (57) ABSTRACT

A system and method is provided for improving sensor precision. In a training phase, a relatively low precision sensor system and a relatively high precision sensor system may record relatively low precision and relatively high precision training motion signals respectively of substantially the same training scene. Machine learning may be performed to generate a transformation mapping information from the relatively low precision training motion signal to the relatively high precision training motion signal. In a run-time phase, a run-time sensor system having a precision significantly less than the precision of the relatively high precision sensor system, may record run-time motion signals of a run-time scene. The run-time motion signal may be transformed using the transformation to generate a transformed run-time motion signal with a precision significantly greater than the precision of the run-time sensor system.

29 Claims, 6 Drawing Sheets

(51) Int. Cl.
*G06N 20/00* (2019.01)
*G01P 13/00* (2006.01)
*G06N 3/08* (2006.01)

(56) References Cited

U.S. PATENT DOCUMENTS

| | | | |
|---|---|---|---|
| 2016/0260261 A1 | 9/2016 | Hsu | |
| 2016/0325143 A1* | 11/2016 | Yuen | A61B 5/681 |
| 2017/0165832 A1* | 6/2017 | Wettels | B25J 19/023 |
| 2017/0179849 A1* | 6/2017 | Yokoi | H02M 7/538 |
| 2017/0357839 A1* | 12/2017 | Yazdandoost | G06K 9/0002 |
| 2018/0184002 A1* | 6/2018 | Thukral | G06F 1/1686 |
| 2018/0300897 A1* | 10/2018 | Woods | G06F 3/0484 |
| 2018/0351475 A1* | 12/2018 | Yokoi | H03K 17/0828 |

\* cited by examiner

DUAL-PRECISION SENSOR SYSTEM USING HIGH-PRECISION SENSOR DATA TO TRAIN LOW-PRECISION SENSOR DATA FOR OBJECT LOCALIZATION IN A VIRTUAL ENVIRONMENT

CROSS-REFERENCE TO RELATED APPLICATIONS

This application is a National Phase Application of PCT International Application No. PCT/IL2018/050915, International Filing Date Aug. 20, 2018, claiming the benefit of U.S. Provisional Patent Application No. 62/548,249, filed Aug. 21, 2017 both of which are hereby incorporated by reference in their entirety.

FIELD OF THE INVENTION

Embodiments of the present invention relate generally to the field of motion detection sensor systems, and improving the accuracy of low precision motion detection sensor systems. More particularly, embodiments of the present invention relate to the use of motion detection sensors to detect human (e.g., head) motion in virtual environments, such as, augmented reality (AR), virtual reality (VR), or mixed reality (MR) system.

BACKGROUND OF THE INVENTION

Modern head-mounted displays (HMDs) used in virtual environments, such as AR, VR and MR headsets, often employ sensors for estimating head position and orientation, e.g., in six degrees of freedom (6DOF). HMDs generally align virtual objects, such as augmented reality (AR) holograms, with the physical world and render the virtual objects with a position and orientation according to the user's estimated head movements.

To achieve high accuracy, current positioning and orientating systems require sensors such as inertial measurement units (IMUs) or camera-based tracking systems, with a high level of precision, which are usually slower (e.g., executing more complex and time-consuming calculations), consume more power, are larger in size, and more expensive than their low precision counterparts.

Accordingly, there is a need in the art to provide a faster and more cost-effective solution to location detection with high levels of accuracy.

SUMMARY OF EMBODIMENTS OF THE INVENTION

In order to overcome the aforementioned problems, a method and a system is provided for increasing a precision level of an object localization system.

In accordance with an embodiment of the invention, a system and method is provided for improving sensor precision. In a training phase, a dual-precision sensor system may record, by a relatively low precision sensor system and a relatively high precision sensor system, motion signals of substantially the same training scene to generate a relatively low precision training motion signal and a relatively high precision training motion signal, respectively. Machine learning may be performed to generate a transformation mapping information from the relatively low precision training motion signal to information from the relatively high precision training motion signal. In a run-time phase, a run-time sensor system may record, by a run-time sensor system having a precision significantly less than the precision of the relatively high precision sensor system, motion signals of a run-time scene to generate a run-time motion signal. The run-time sensor system may transform the run-time motion signal using the transformation to generate a transformed run-time motion signal with a precision significantly greater than the precision of the run-time sensor system (e.g., approximately equal to or on the order of the precision of the relatively high precision training motion signal).

In accordance with an embodiment of the invention, a dual-precision sensor system is provided comprising a relatively low precision sensor system, a relatively high precision sensor system, and one or more processors configured to train a precision-improving transformation. In a training phase, the relatively low precision sensor system and the relatively high precision sensor system may be configured to record motion signals of substantially the same target object to generate a relatively low precision training motion signal and a relatively high precision training motion signal, respectively. One or more processors may be configured to perform machine learning to generate a transformation mapping information from the relatively low precision training motion signal to information from the relatively high precision training motion signal. When the transformation is applied to a run-time motion signal recorded by a run-time sensor system having a precision significantly less than the precision of the relatively high precision sensor system, a transformed run-time motion signal may be produced with a precision significantly greater than the precision of the run-time sensor system (e.g., approximately equal to or on the order of the precision of the relatively high precision training motion signal).

In accordance with an embodiment of the invention, a run-time sensor system is provided comprising one or more memory units configured to store a transformation mapping information from a relatively low precision training motion signal recorded by a relatively low precision sensor system to information from a relatively high precision training motion signal recorded by a relatively high precision sensor system. The run-time sensor system may be configured to record run-time motion signals, wherein the run-time sensor system has a precision significantly less than the precision of the relatively high precision sensors. The run-time sensor system may comprise one or more processor configured to transform the run-time motion signal using the stored transformation to generate a transformed run-time motion signal with a precision greater than the precision of the run-time sensors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "detecting," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The term "head-mounted display" or "HMD" may refer to a display device mounted on a user's head by an attachment device such as a harness, a helmet, a rig, or a visor. In augmented reality (AR) platforms, HMDs combine images of both the physical or real world (e.g., displayed via standard optical lenses) and virtual graphics (e.g., displayed via digital projection) in the user's field of view. In virtual reality (VR) platforms, HMDs are used to replace the physical scene, displaying exclusively virtual graphics (e.g., displayed via a LCD screen) in the user's field of view. Mixed reality environments combine AR and VR capabilities.

The term "six degrees of freedom" or "6DOF" may refer to a freedom of movement of a rigid body in three-dimensional space. In some cases, the body is free to change position as forward/backward (surge), up/down (heave), left/right (sway) translation in three perpendicular axes, combined with changes in orientation through rotation about three perpendicular axes, often termed pitch, yaw, and roll.

The term "motion" may refer to any information related to the location of a point or a rigid body in space or time, including but not limited to, position and its derivatives (e.g., speed/velocity, acceleration, etc.), momentum, orientation and its derivatives (e.g., rotational speed/velocity, rotational acceleration, etc.), angular momentum, absolute motion at a single point in time, relative or change in motion between two points in time, and predicted future motions.

The term "sensor" may refer to a single sensor or a sensor system comprising one or multiple sensors. The sensor or sensor system may include, or be operably connected to, a location detection system operating one or more processor(s) and/or process(es) that computes, based on raw sensor measurements, motion measurements (e.g., 6DOF) of the sensor/system or a target object/position.

The term "Inertial Measurement Unit" or "IMU" may refer to a collection of sensors that measures various physical quantities such as acceleration and rotation speed, allowing the inferring of the motion of the device from them.

The term "precision" of a sensor system may refer to a similarity (e.g., accuracy) or difference (e.g., error defined by the inverse of similarity) between one or more motion value(s) computed by the system (or data, e.g. virtual objects, derived therefrom) compared to one or more benchmarks or thresholds of true or ideal motion value(s) (e.g., measured in the real-world, pre-defined by design, such as a programmed sequence of motions performed by a robot, or computed by a high-reliability device and/or process). Precision may be calculated in many ways, a few examples of which are provided below. In one embodiment, the precision of a sensor system may be a measure of similarity or difference between the computed motion values of the system and "ground-truth" motion values (e.g., measured directly in the real-world or using a sensor). For example, if a device moves ten inches and the system computes a motion of nine inches, then the precision may be 9 inches or 90% similarity or 1 inch or 10% error (e.g., percentage error=100-percentage precision). In another embodiment in virtual environments, the precision of a sensor system may be a measure of similarity or difference between the user-perceived motion of a virtual object (e.g., measured by a device in-line with the use's field of view) and the target motion of the virtual object intended to be simulated by a virtual device. For example, a HMD may simulate a hologram programmed to move together with a user to appear fixed in a 3D location from the user's perspective. Precision may be a measure of an amount by which the hologram appears to move independently of the user (e.g., measured assuming we have ground truth). The amount the hologram appears to move independently of the user may be calculated, for example, by first generating a point-hologram at a 3D location, relative to a starting point of a device (e.g., HMD attached to the user). At each point in time, given a position and orientation (x1,y1) of the device (e.g., one provided by a "ground truth" measurement and one for the device to be measured), some embodiments of the invention may calculate the location(s) at which the hologram is displayed or programmed to be displayed in the field of view of a user (e.g., the actual (x2,y2) coordinates on the display). In some embodiments, the hologram may not need to actually be rendered, only the mathematical formula for projecting onto the display may need to be solved. The precision may be defined based on the error or distance between the ground truth position (x1,y1) and the computed position of hologram display (x2,y2) obtained from system. In some embodiments, pixels may represent a line of sight (e.g., a direction of a ray of light), and thus it may be more accurate to translate the error from pixels to angular error and represent the precision based on the angular difference. Precision may be an absolute measure (e.g., distance between the computed and benchmark motions) or a relative measure (e.g., a percentage of the error distance compared to an overall distance or duration of the movement). In some embodiments, precision may be determined without measuring true motion data (e.g., by system design, statistics, or measuring an indirect result of the motion, etc.). In some embodiments, precision may be a category or level (e.g., high vs. medium vs. low, based on a range of values) instead of an exact value.

In one example, a low-precision system includes a set of low-quality (e.g., one, two or four) cameras (e.g., producing relatively blurry, noisy, or low-resolution images) and/or an IMU, which are relatively inexpensive, low-accuracy, and low-power consumptive components. The cameras and/or an IMU are mounted to a motorized device that moves according to pre-programmed motions that serve as the benchmark motion values for comparison to determine precision. The relative calibration (e.g., relative position) of the cameras and/or an IMU may or may not be known. A high-precision system includes a set of high-quality cameras, e.g., mounted to the walls, tracking a set of reflectors that are attached to the tested device. The cameras are fixed. A calibration is performed before recording. Due to the knowledge of the target reflectors, the system is able to detect the reflectors with high accuracy.

The term "high" or "relatively high" precision and "low" or "relatively low" precision are relative terms, referring to a measure of precision relative to each other's precision or to a predetermined threshold. A relatively low precision device has either inferior hardware (e.g., cheaper materials used in the manufacturing of the sensor(s) causing poor quality data) or inferior software processes (e.g., solving fewer equations, ignoring some data, running fewer computational iterations, or limiting search areas, etc.) than a relatively high precision device. The relative difference in precision between relatively high and relatively low precision may be significant, for example, at least a 15% deviation and preferably at least a 25% deviation. For example, a low or relatively low precision sensing system achieves a precision with a motion calculation error of 1-20 mm (e.g., 3 mm), 0.006-0.1 radian (e.g., 0.01 radian), and/or a stability of 0.01-2 mm/sample (e.g., 0.2 mm/sample) or greater. In some example cases, a high or relatively high precision sensing system achieves a precision with a motion calculation error of $0\text{-}0.\overline{9}$ mm (e.g., 0.1 mm), $0\text{-}0.005\overline{9}$ radian (e.g., 0.001 radian), and/or a stability of $0\text{-}0.0\overline{9}$ mm/sample (e.g., 0.02 mm/sample). These values may referrer to the precision of a system as a whole, while individual sensors or components may (or may not) have lesser precision. In some embodiments, a high precision sensor system may compute motion at a relatively faster rate than a relatively lower precision sensor system. For example, a low or relatively low precision sensing system computes motion at a frequency of 10 frames per second (FPS) or 200 Hz and a high or relatively high precision sensing system computes motion at a frequency of 90 FPS or 1000 Hz. Other values or thresholds may be used.

According to some embodiments of the invention, a dual-precision sensors system is provided comprising both relatively high and relatively low precision sensors (e.g., relative to each other or to respective thresholds) for training and improving the accuracy of location detection data recorded by the low-precision sensors. The dual-precision sensors system may record parallel streams of relatively high and relatively low precision motion signals of substantially the same scene by the respective relatively high and relatively low precision sensors. During a training phase, the dual-precision sensors system may train a model, e.g., using machine learning, to transform input data from the relatively low-precision motion signals to output data from the relatively high-precision motion signals. The model may be an N-layered neural network inputting pairs of corresponding data of the same scene from the relatively low-precision sensors and data from the relatively high-precision sensors. The plurality of (N) neural layers may be trained by machine learning to transform the relatively low-precision sensor data into a signal optimized to match the relatively high-precision sensor data. The number of layers N, as well as the layer and node weights, may be tuned by machine learning to achieve an optimized transformation, for example, by minimizing differences or errors between the transformed low-precision sensor data and the relatively high-precision sensor data. In some embodiments, the relatively high and low precision sensors measure motion (e.g., 6DOF) of/from different points in space and/or using different coordinate systems. The relatively high and low precision data may therefore be normalized to a common position and/or coordinate system. In one embodiment, normalization may be achieved by using machine learning to learn a normalization transformation between the different positions or coordinate systems and apply the normalization transformation to one or both of the high or low-precision data to normalize the data. The normalization transformation may be trained together with, or in a separate initial pre-training phase prior to, training the precision transformation in the training phase.

A sufficient variety of types of motions should be recorded in the training scene to anticipate the variety of movements that might occur during a run-time recording. The input and output data to the model may be sensor parameters, raw sensor data, or data derived therefrom, such as motion data, and/or sensor internal parameters, sensor relative parameters, tracking quality (e.g., an internal measure that attaches a quality level to a current measurement).

Once the model is trained, in a run-time phase, a location detection system, such as a HMD, may use only sensors having a precision significantly less than the (e.g., by at least 25%) the precision of the high-precision sensors used in the training phase. For example, run-time sensors may have a precision exactly or approximately, e.g., within 10% accuracy, equal to the precision of the low-precision sensors used in the training phase). The location detection system may apply the trained transformation to the run-time (low-precision) sensor data (or motion information derived therefrom) to improve the precision thereof (e.g., to be significantly, by at least 25%, and preferably 50% greater than the precision of the low-precision sensor data, and, in some embodiments, to approximate, within 10% accuracy, the precision of the high-precision sensor data, used in the training phase). Additionally or alternatively, training may improve the robustness of the run-time motion detection (e.g., reduce the number of significant errors). Accordingly, relatively low-precision run-time sensors may be used to generate relatively high-precision motion data (without using relatively high-precision sensors).

In embodiments, the relatively high-precision sensor system may compute motion at a relatively higher frequency or rate than a relatively lower frequency or rate computed using the relatively low-precision sensor system. During the training phase, the relatively higher frequency calculations may be input to train the model to improve the frequency or response time/latency of the run-time motion calculations. During the run-time phase, the model may input the run-time sensor data having a relatively low frequency (e.g., a number of calculation frames on the order or within 10% of the relatively low-precision sensor system from the training phase) and may output or predict new motion data, between low frequency reading frames, to increase the rate of motion calculations (e.g., to be significantly, by at least 25% and preferably 50%, greater than the frequency of the run-time sensor calculations, and, in some embodiments, to approximate, within 10% accuracy, the frequency of the high-precision sensors used in the training phase). Additionally or alternatively the run-time latency may improve by training the system with the relatively higher frequency motion data. For example, the relatively higher frequency motion data may be used to correlate a series of low-precision sensor data with specific motions, such that, during the run-time phase a smaller number of data samples is needed to compute the same motions relative to a non-trained run-time dataset.

Then, still in a run-time phase, the HMD may render one or more virtual objects in an AR, VR or MR display according to head motions represented by the transformed motion information. Because the precision and/or frequency of the motion information is improved by the transformation, the positioning and realism of the virtual object in the rendered image is also improved, as compared to an image rendered from the non-transformed motion information.

In addition to improving motion detection accuracy and image rendering accuracy, embodiments of the invention may also improve the power efficiency of motion detection systems. Relatively lower-precision sensor systems generally operate using a relatively lower computational load, and therefore less power, than relatively higher-precision sensor systems. Embodiments of the invention, may thus use less power (using only low-precision sensors) to achieve the same or similar precision to high-precision motion detection systems (using more energy consumptive high-precision sensors). Accordingly, it may be more power efficient (use less energy) for a motion detection system to detect motion by processing motion information measured by low-precision sensors and then transforming that data into high-precision sensor data according to embodiments of the invention, as compared to processing motion information measured by high-precision sensors.

Figure 1A:
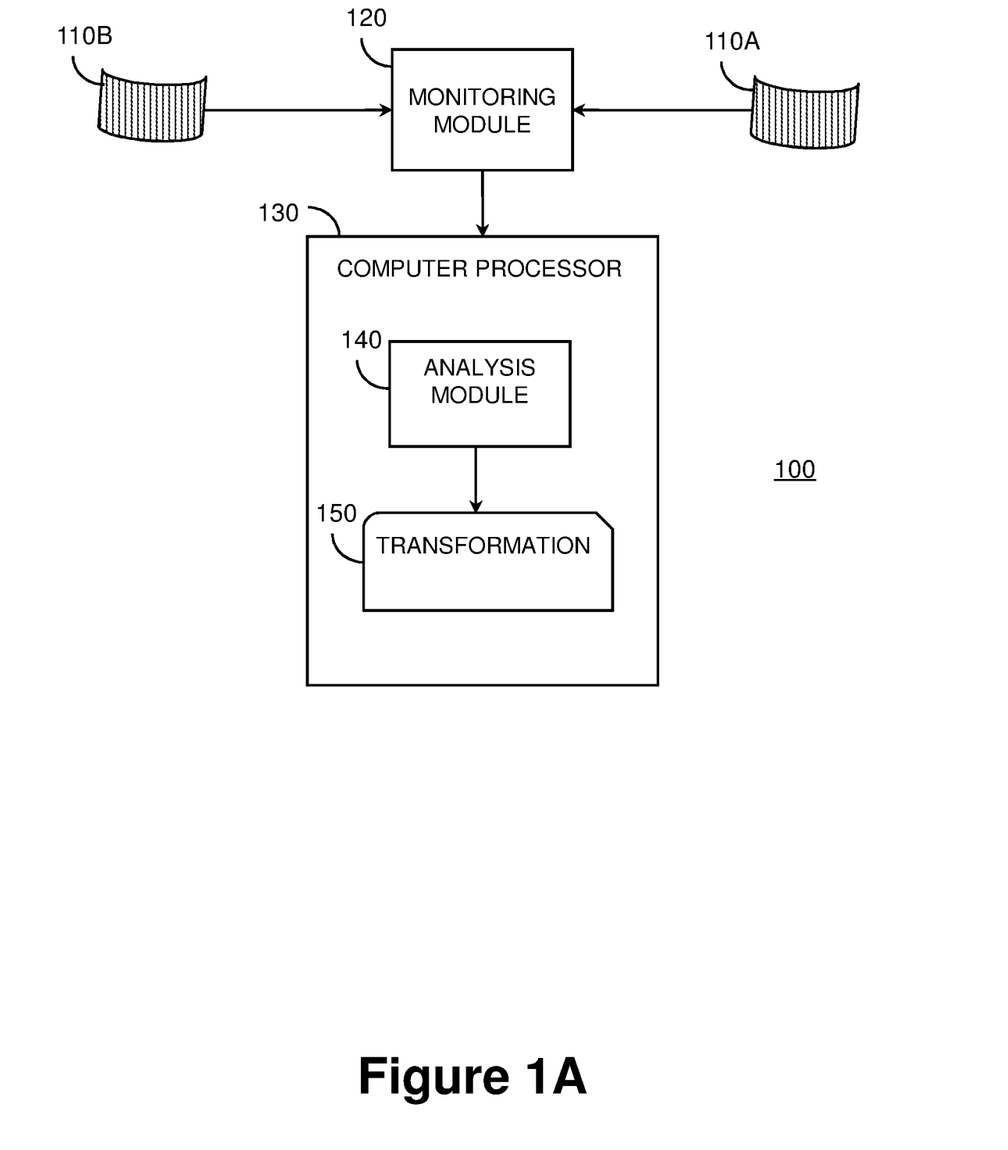
FIG. 1A is a schematic illustration of a dual-precision sensor system operating in a training phase in accordance with some embodiments of the invention.
Figure 1B:
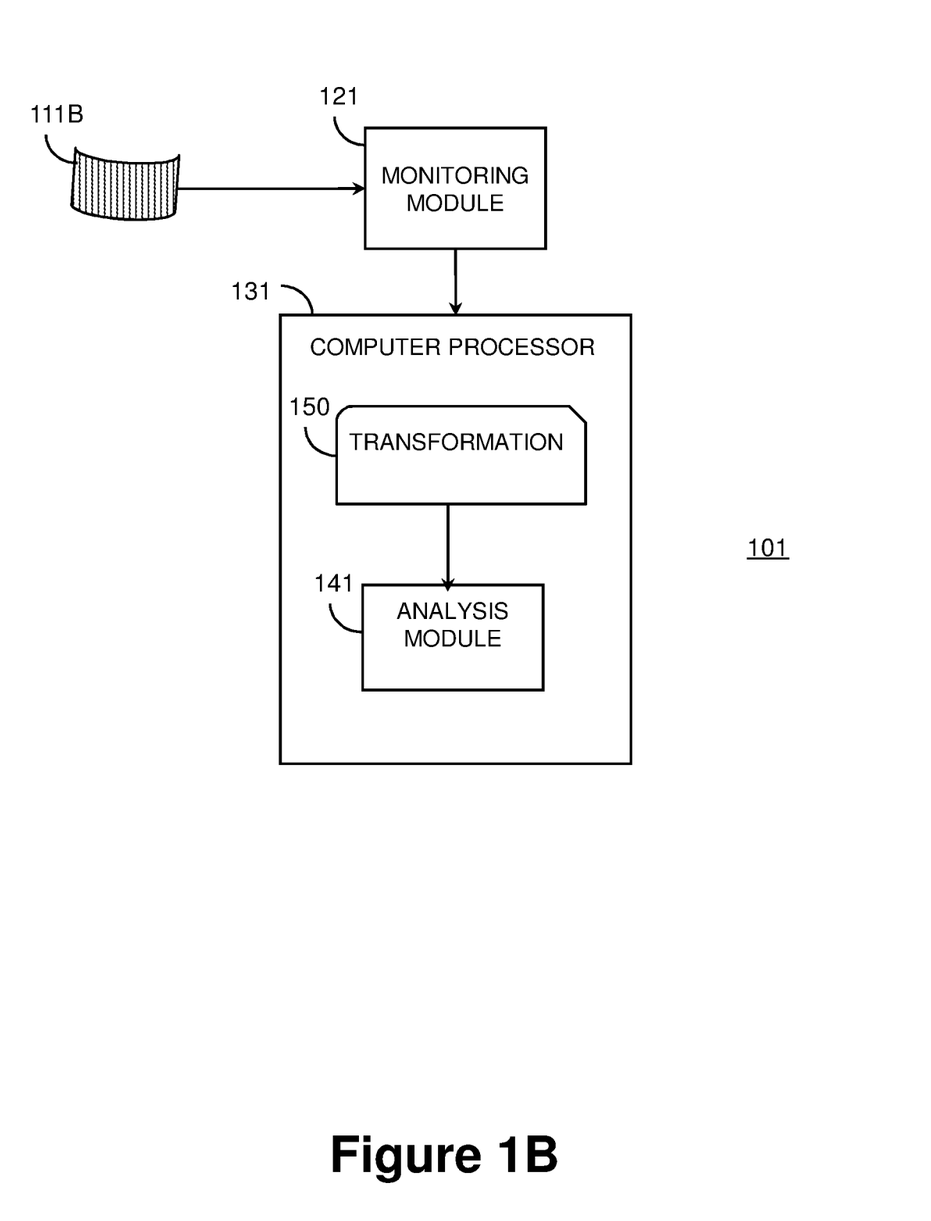
FIG. 1B is a schematic illustration of a sensor system operating in a run-time phase in accordance with some embodiments of the invention.

System 100 of FIG. 1A may operate a training phase for run-time system 101 of FIG. 1B to operate a run-time phase. In the training phase of FIG. 1A, system 100 may perform experiments and simulate scenes used to adjust, calibrate, and optimize the operational parameters of a motion detection transformation model prior to its use by system 101 in the run-time phase of FIG. 1B, during which the operational parameters of the system (e.g., HMD) are generally fixed. System 100 of FIG. 1A may use both relatively low and high precision sensors in the training phase, using data form the high precision sensors to train the motion detection transformation to improve motion detection based on data from the relatively low precision sensors. In contrast, system 101 in the run-time phase of FIG. 1B may use only sensors 111B having precision significantly less than the precision of the relatively high precision sensors used in the training phase (e.g., having the same or similar, increased, or decreased precision as the relatively low precision sensors used in the training phase) and may boost the motion detection precision according to the trained transformation.

Reference is now made to FIG. 1A, which is a schematic illustration of a dual-precision sensor system 100 operating in a training phase in accordance with some embodiments of the invention. System 100 may include a first object localization system 110A comprising one or more relatively high precision sensors and a second object localization system 110B comprising one or more relatively low precision sensors. Relatively high precision sensors may have a precision that is greater than a precision of the relatively low precision sensors or a predetermined threshold precision e.g., with a motion calculation error of 1 mm distance, 0.006 radians, and/or a stability error of 0.1 mm/sample. Similarly, relatively low precision sensors may have a precision that is less than a precision of the relatively high precision sensors or the same or different predetermined threshold precision. Relatively high precision sensors may have superior hardware (e.g., a greater resolution detector array) or superior software processes (e.g., solving more equations, inputting more data, running a greater number of computational iterations, etc.) than the relatively low precision sensors. Precision may be measure of one or more parameters including, for example, motion calculation resolution (e.g., pixel density for cameras), frequency, distance error (absolute or relative/compared to ground-truth or user-perceived), or any combination thereof. A high precision sensor system may have different hardware and/or software than a low precision sensor system. Sensor precision may vary, for example, based on the number of sensors (e.g., an increased number typically correlated with increased precision) and sensor configuration (e.g., distance between them may effect performance). Camera precision may vary, for example, based on the number of independent pixels imaged by the camera, field of view, noise level (e.g., quantum efficiency), sensitivity, integration time and lens quality. IMU precision may vary, for example, based on random walk noise, bias, change of bias over time, cross-axis non linearity, sensitivity to temperature, limited dynamic range, performance depending on signal (e.g., different responses to different speeds). Various arrangements of sensors in localization systems 100A and 110B are described in reference to FIGS. 2-4.

During the training phase of FIG. 1A, the first object localization system 110A comprising relatively high precision sensors and the second object localization system 110B comprising relatively low precision sensors are configured to record motion signals of substantially the same training scene tracking a target object to generate two parallel signals, a first relatively low precision motion signal and a second relatively high precision motion signal, respectively. The motion signals may contain information defining the motion of the tracked target object in the scene, including but not limited to, position, speed, velocity, acceleration, momentum, orientation, rotational speed, rotational velocity, rotational acceleration, angular momentum, or any combination or function thereof, all of which may be measured as absolute or relative motion, and a current or predicted future time. The first and second object localization systems 110A and 110B may record the same scene simultaneously, or may record a reproduction (e.g., repeated iterations) of the same object motion separately (e.g., at different times). When the first and second object localization systems 110A and 110B record a scene separately, each iteration of the scene may follow the same movements of the tracked target object in a manner that preserves the same or similar operational parameters affecting the object localization. In one example, a robot or other mechanized device may be programmed to repeat, in full, exactly (or approximately) the same sequence of movements in each iteration of the scene to be separately recorded by the first and second object localization systems 110A and 110B.

Raw sensor data from system 100 sensors may be processed to generate motion signals (e.g., position and orientation information), either locally by embedded circuitry in the sensors themselves, or by a motion tracking module in the first and second object localization systems 110A and 110B, and/or by a separate external monitoring module 120. The motion information may be transferred to, and received by, computer processor 130 where an analysis module 140 may analyze the motion signals and train the system 100 to generate a de-noising function or transformation 150 that boosts image precision.

During the training phase, upon computer processor 130 receiving the relatively high and relatively low precision motion signals from the first and second object localization systems 110A and 110B (or via an intermediate monitoring module 120), the computer processor 130 (e.g., analysis module 140) may be configured to perform a machine learning procedure to generate a transformation 150 that maps information from the relatively low precision motion signal into information from the relatively high precision motion signal. In particular, the relatively high precision motion signal may be used as a benchmark to train and transform the relatively low precision motion signal into relatively improved or higher precision motion information. The processor 130 may perform machine learning using a variety of training methods including neural networks, direct database interference, dictionary learning, and others.

In embodiments using neural networks, the processor 130 may perform machine learning using a neural network that inputs the relatively low precision training motion signal and relatively high precision training motion signal corresponding to the same scene or motions. The neural network trains a transformation 150 by computer processor 130 to map the relatively low precision motion signal to fit the relatively high precision motion signal. The neural network may be configured with a number of layers, a structure of each layer (number of neurons), and connection between layers, which may be fixed or tuned by machine learning. Additionally, multiple networks structures may be connected, and additional fixed operators (such as binning, discretization, etc.) may be introduced before or after the operation of every layer. In one embodiment, the neural network may have a layout referred to as "Long Short Term Memory", in which in each stage only new (non-redundant) data is input from the sensors, but that also stores the results of current and previous iterations of the network (e.g., the same current motion signal may be interpreted differently if the previous action was running or sitting down). By only training the neural network based on new non-redundant data, while still benefiting from the results of training previous data, such embodiments may minimize storage requirements and calculations to improve speed and increase available memory while achieving the same or similar results. This is due to the system explicitly learning the progression of data over time, instead of the need to observe the entirety of the data at once.

In embodiments using direct database interference, the training phase may include building a database of pairs of low-quality signals and their high quality counterparts and possibly structuring the database to optimize search speed. During the run-time phase, given a low-quality signal, the processor 130 may search the database for a plurality of (N) (e.g., 1, 5, . . . ) most similar low-quality signals (e.g., using an exact or approximate search). The processor 130 may retrieve from the database the (N) high-precision signal equivalents of this low-quality signal, and may merge the (N) retrieved high-precision signals into a merged signal. The low-quality signal obtained in the run-time phase may be replaced by the merged signal, which is based on high-precision data and is generally better precision than the low-quality run-time signal. The merging may be performed, for example, by averaging, or weighted averaging, where the weights are determined as a function of the difference or similarity between the input run-time low-precision signal and the selected low-precision signals from the database (e.g., weight is proportional to inverse squared distance).

In embodiments using dictionary learning, the training phase may connect, link or correlate, for each data sample, the low-precision signal and the high-precision signal of the same scene or motions. Then, a training procedure, such as a K-SVD, may learn a dictionary, which may be a set of "atom" signals, such that each (or almost all) training signals can be represented as a weighted combination of a small number of "atoms" from this dictionary. Each atom in this dictionary may have a part that is learned from the low-precision part of the data, and a part that is learned from the high-precision part of the data. Since the training stage is jointly executed for the low and high precision data, each training sample (which contains both low and high precision parts) may be represented as a weighted combination of atoms. For example, the low-precision part is represented as a weighted combination of the low-precision part of the atom, and the high-precision part of the training sample is represented as a weighted combination (with the same respective weights) as the high-precision part of the same atoms. During the run-time phase, only a low-precision signal is received, so the processor computes its representation as a weighted combination of only a small number of atoms, and using only the low-precision part of those atoms (e.g., defined by atom index). The processor may compute this representation using any "pursuit" process, e.g., Orthogonal Matching Pursuit (OMP). Once the indices of the atoms selected and their weights are determined, the processor may generate a higher precision signal to be the weighted sum of the high-precision parts connected or correlated to the low-precision parts of the low-precision-sum, using the same weights.

Reference is now made to FIG. 1B, which is a schematic illustration of a sensor system 101 operating in a run-time phase in accordance with some embodiments of the invention. System 101 may be an augmented reality (AR), virtual reality (VR), or mixed reality (MR) system employing an HMD comprising monitoring module 121, computer processor 131, analysis module 141, and transformation 150 (output by the training phase of FIG. 1A). Monitoring module 121 may include, or be operatively connected to, one or more sensors 111B. Sensors 111B may have a precision that is approximately or exactly equal to, less than, or greater than, the precision of the low-precision sensors used in the training phase system (e.g., sensors in 110B of FIG. 1A). System 101 does not use sensors having a precision significantly higher than the precision of the low-precision sensors (e.g., not approximately equal to the precision of the relatively high-precision sensors used in the training phase system, such as, sensors in 110A of FIG. 1A). System 101 sensors 111B are configured to record sensor data, which monitoring module 121 (or the sensors themselves) are configured to process to generate motion signals of a run-time scene to generate a relatively low precision run-time motion signal.

Then, in the run-time phase, computer processor 131 may be configured to transform the relatively low precision run-time motion signal using the transformation 150 (generated in the training phase) to a relatively high precision run-time motion signal (using only relatively low precision sensors 111B and not using relatively high precision sensors). Accordingly, the training phase serves to generate a transformation 150 that improves the precision of relatively low precision run-time sensors 111B, thereby providing improved object localization for virtual reality, augmented reality, and mixed reality applications. The processor 130 may adjust the rendering of a virtual object or hologram projected by the HMD system into the user's field of vision according to the transformed motion signal, yielding relatively improved or high accuracy motion information and corresponding images using only relatively low accuracy sensors 111B.

Figure 2:
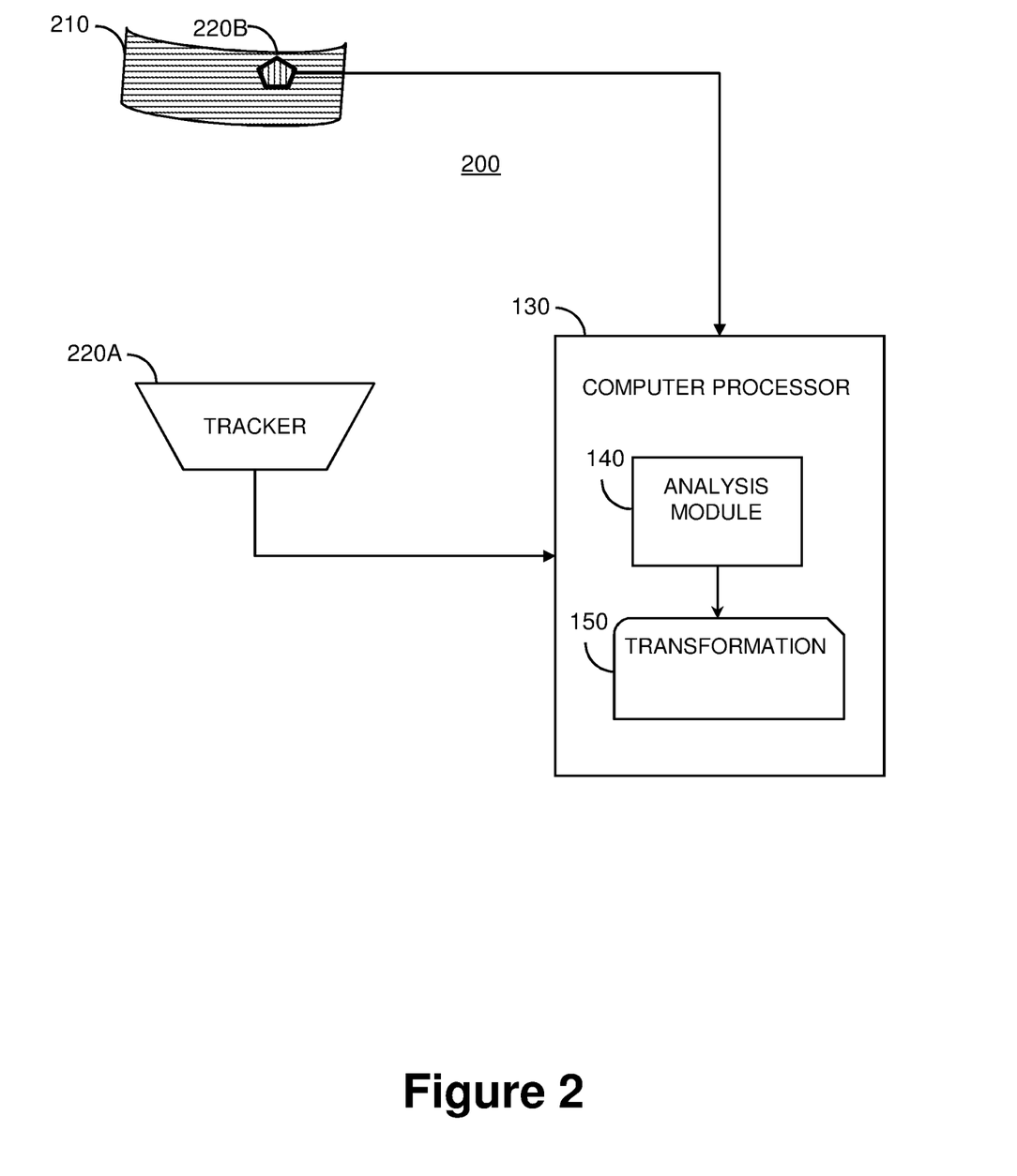
FIG. 2 is a schematic illustration of a dual-precision sensor system with a first sensing system positioned separate from a tracked target object and a second sensing system mounted with the tracked target object in accordance with some embodiments of the invention.

Reference is made to FIG. 2, which is a schematic illustration of a dual-precision sensor system 200 with a first sensing system positioned separate from a tracked target object 210 and a second sensing system mounted with the tracked target object 210 in accordance with some embodiments of the invention.

Both sensing systems 220A and 220B may track the same motion of a target object or user 210. Target object 210 may be moved during a training scene by a robot, rig, or other mechanical device. In one embodiment, system 200 includes a relatively high precision sensor monitoring system 200A, such as a camera or image tracker, and a relatively low precision sensor monitoring system 200B, such as a low-precision IMU. In FIG. 2, one monitoring system 200A or 200B is mounted on (e.g., physically attached to), and/or moves together with, the target object 210 (or its mount), detecting the target object's motion as a function of its own motion (e.g., under translation and/or rotation, based on the sensor and target's relative position). The other one of the monitoring system 200B or 200A, respectively, is positioned separately and externally (e.g., physically detached) from, and moves independently of, the target object 210 (or its mount). Generally, the separate monitoring system is an imager or motion tracker, positioned (e.g., stationary) with the target object 210 in its field of view.

While in the example shown in FIG. 2, the relatively higher precision monitoring system 200A is shown to be positioned separate from the target object 210 and the relatively lower precision monitoring system 200B is co-mounted with the target object 210, in other embodiments the relatively higher precision monitoring system 200A is co-mounted with the target object 210 and the relatively lower precision monitoring system 200B is positioned separate from the target object 210.

Figure 3:
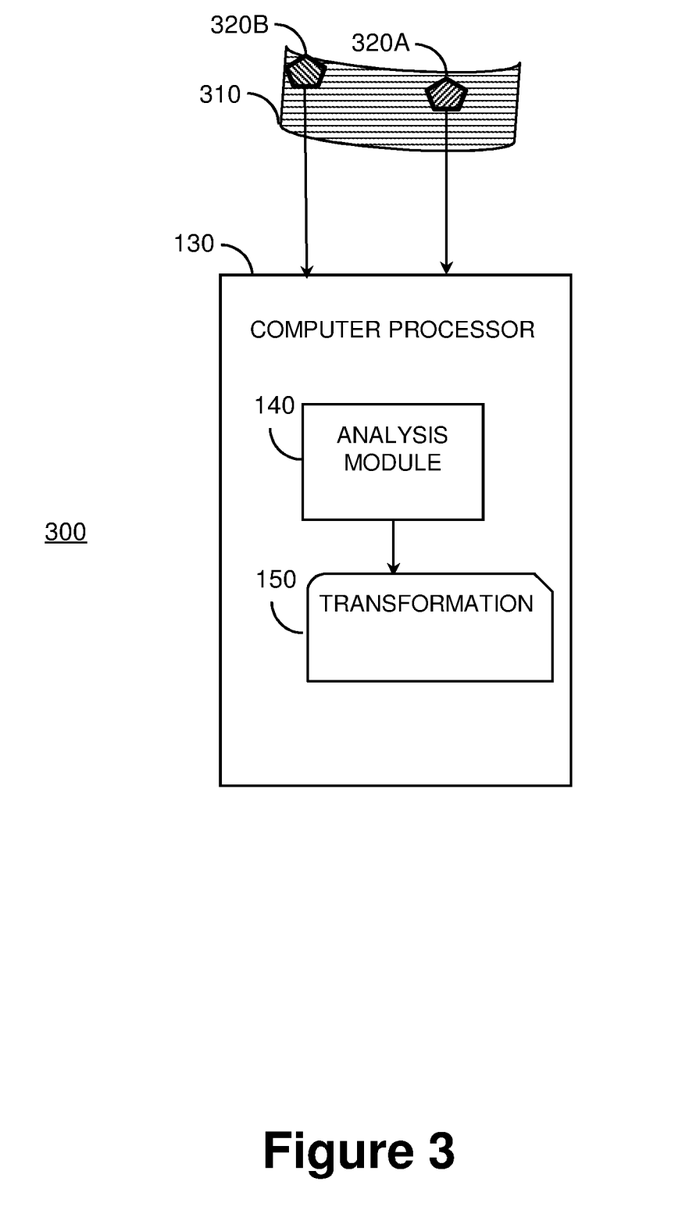
FIG. 3 is a schematic illustration of the dual-precision sensor system with a first and second object localization systems both mounted with a tracked target object in accordance with some embodiments of the invention.

Reference is made to FIG. 3, which is a schematic illustration of a dual-precision sensor system 300 with both a first and second object localization systems mounted or co-located with the tracked target object 310 in accordance with some embodiments of the invention. Both object localization systems 320A and 320B may be mounted on (e.g., physically attached to), and/or move together with, the target object 310 (or its mount), and may track its motion as a function of their own motion under a translation and/or rotation according to the separation in space between each sensor and target object 310. One of the object localization systems has a relatively higher precision (e.g., 320A) and the other one of the object localization systems has a relatively lower precision (e.g., 320B). In one embodiment, system 300 includes a relatively high precision IMU and a relatively low precision IMU.

Figure 4:
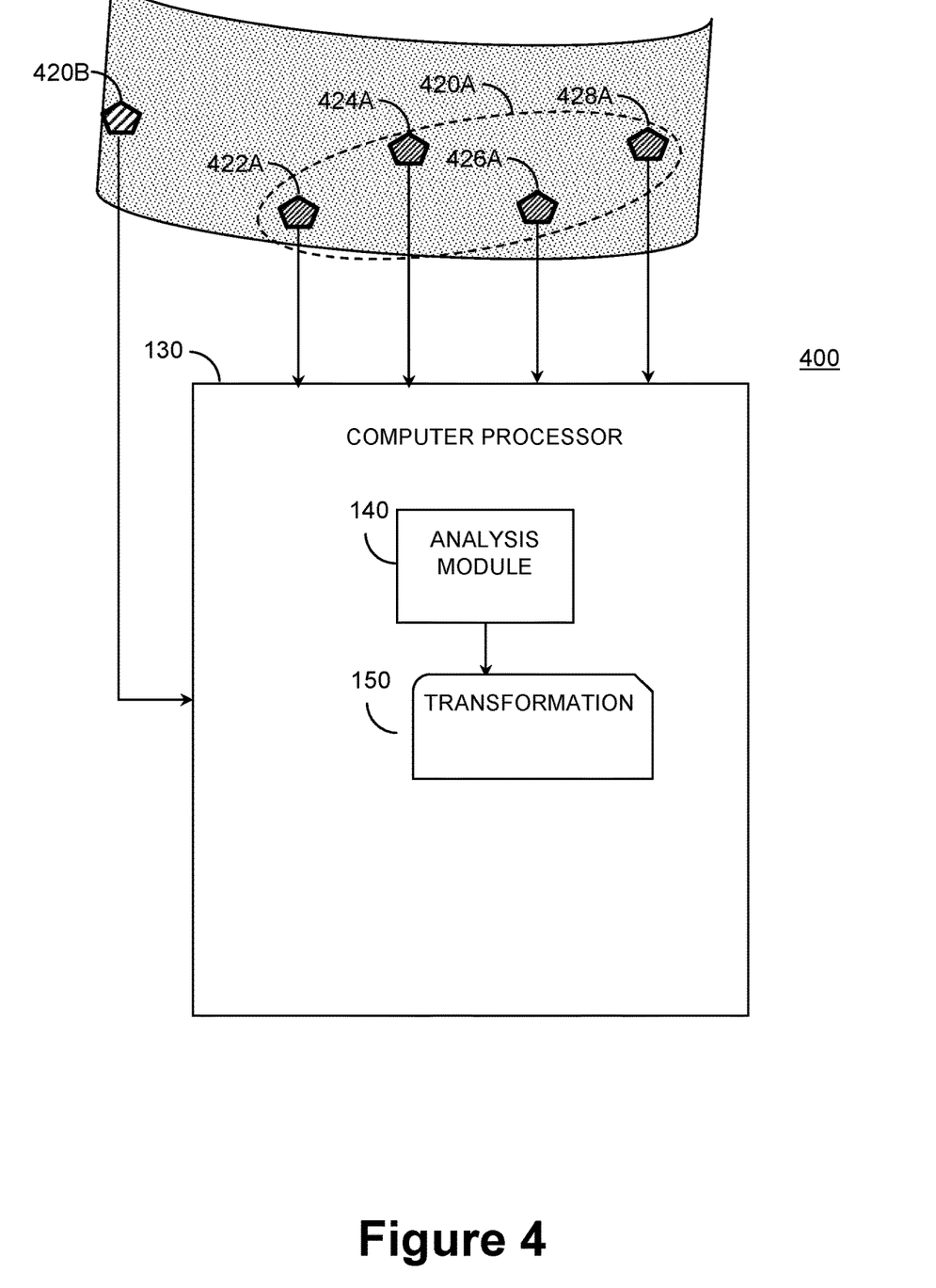
FIG. 4 is a schematic illustration of a dual-precision sensor system with a multi-sensor object localization system and a single-sensor object localization system in accordance with some embodiments of the invention.

Reference is made to FIG. 4, which is a schematic illustration of a dual-precision sensor system 400 with a multi-sensor object localization system 420A and a single-sensor object localization system 420B in accordance with some embodiments of the invention. Each sensor in object localization systems 420A and 420B may be mounted or co-located with a tracked target object 410 (as shown) or may be positioned separately from and facing the target object 410.

Multi-sensor object localization system 420A may include a plurality of sensors 422A, 424A, 426A, and 428A (and possibly 420B) operating collectively. Multi-sensor object localization system 420A, monitoring device 120, and/or computer processor 130 may be configured to aggregate data from the plurality of sensors 422A-428A, for example, by averaging or otherwise combining the individual sensor data (or motion information derived therefrom), while compensating for axes alignment, to yield aggregated sensor or motion data with significantly higher precision than is associated with any individual one of the sensors. The aggregation function may be weighted based on sensor precision, proximity to the target object 410 (or its center of mass), or other parameters. The aggregation function may be an averaging function, an accumulation function, a polling function, or a filtering function such as using a Kalman filter that fuses the measurements with their covariances to obtain a unified measurement. The aggregation function may disregard individual readings that diverge from other sensor(s)' readings by greater than a predetermined factor, e.g., to eliminate sensor errors. Single-sensor object localization system 420B may produce readings from a single sensor alone. Each of the sensors of the relatively higher and relatively lower object localization systems may individually have a same (or different) level of precision, but the plurality of sensors 422A-428A of the relatively higher precision object localization system 420A are configured to operate collectively to produce an aggregated motion signal that has a higher cumulative precision than that of a motion signal produced by the single sensor 420B alone.

In one embodiment, the single sensor of the single-sensor object localization system 420B may have a same or similar precision level as the precision level of one or more of the sensors of the multi-sensor object localization system 420A. Additionally or alternatively, the single sensor of the single-sensor object localization system 420B may be one of the plurality of sensors of the multi-sensor object localization system 420A.

In general, a relatively lower precision object localization system 420B may include a number (M) of one or more sensors and the relatively higher object localization system may include a different number (N) of one or more sensors. Where the precision of all (M) and (N) sensors are the same, the relatively lower precision object localization system 420B may include a relatively lower number (M) of sensors and the relatively higher object localization system 420A may include a relatively greater number (N) of sensors relative to each other, such that N>M and N, M are integers. Where the precision of some or all of the (M) and (N) sensors are different, the cumulative precision of the motion data aggregated from the (N) sensors is greater than the cumulative precision of the motion data aggregated from the (M) sensors. The sets of (M) and (N) sensors may be overlapping, inclusive or exclusive sets.

In general, in addition to the various sensors arrangements of FIGS. 1A-4, systems according to embodiments of the invention may have any sensor arrangement including relatively low-precision sensors either internal to (co-mounted with) the target object, external to (physically separable from) the target object, or both internal and external to the target object. Similarly, system sensor arrangement according to embodiments of the invention may include relatively high-precision sensors either internal to (co-mounted with) the target object, external to (physically separable from) the target object, or both internal and external to the target object. For example, a system according to embodiments of the invention may include a first set of sensors mounted externally (e.g., on the walls) as well as an additional set of passive sensors or otherwise assisting components (e.g., IR reflectors, QR codes) mounted on the target object. Other example systems may have only external sensors, e.g., without any sensor mounted with the target object being tracked.

In some embodiments, the learning or training process uses signals that evolve over time, and have some temporal dependency. So, for example, if a relatively long session (e.g., above a threshold duration of time, such as, 10, 100, 1000, . . . , seconds) is recorded, the session may be broken into relatively shorter parts (e.g., 1 second intervals). The relatively shorter parts may overlap (e.g., a 100 second session may be divided into more than 100 parts, such as 1000 parts if the parts have a duration of 1 second and start every 0.1 second). Further, the learning or training process may have a temporal dependency. For example, the motion detection of a currently processed part (e.g., a nth 1 second of data) may be trained to depend on one or more preceding parts (e.g., any of the 1, . . . , (n-1)th 1 second parts of data). The temporal dependency may be trained, for example, using Long Short Term Memory in the context of neural networks or using different learning algorithms.

In some embodiments, the high-quality and low-quality systems may produce different types or formats of output signals. For example, the high-quality system may produce a complete motion dataset (e.g., a series of 6DOFs), while the low-quality system may produce only a partial dataset (e.g., less than 6DOFs, where an IMU only produces rotation speed and accelerometer data and a camera only produces relative rotation and scale-less translation, i.e., a direction of movement but not its absolute size). In such cases, embodiments of the invention may train a model to transform the low-quality data (e.g., less than 6DOFs) into the format or data type of the high-quality data (e.g., a 6DOF dataset).

In various embodiments, each of the relatively low precision training motion signal and the relatively high precision training motion signal is "real" data measured by one or more sensors or "synthetic" data simulated on a computer. In some embodiments, both the high-quality data and low-quality data may be real data measured by sensors. In other embodiments, the low-quality data may be synthetic data simulated from real high-quality data, for example, using a noise model or degradation method. In other embodiments, both the high-quality data and low-quality data may be synthetic data, where the high-quality data is initially simulated and then processed, e.g., using a noise model or degradation method, to simulate the low-quality data. In some embodiments, the synthetic high-quality data and/or low-quality data may be all or part of the data used in training (e.g., the training dataset may include a mix of real data and synthetic data).

In some embodiments, the quality of the sensing system may not be a product of its own properties, but may depend on external operating conditions. For example, an optical tracking system may have better precision in an environment with an optimal level of light (e.g., enough light that noise levels are low and the camera can use short integration time, but not so much that the light saturates the sensors). Embodiments of the invention may train a model by recording training input stream using optimal external operating conditions associated with improved or relatively high precision data, and sub-optimal external operating conditions associated with degraded or relatively low precision data. The model may be applied during run-time to improve the accuracy of data recorded during sub-optimal external operating conditions, for example, to approximate the accuracy of data recorded during optimal external operating conditions.

Monitoring modules 120 and 121, computer processors 130 and 131, and analysis modules 140 and 141, may each include one or more controller(s) or processor(s) for executing operations and one or more memory unit(s) for storing data and/or instructions (e.g., software) executable by a processor. Processor(s) may include, for example, a central processing unit (CPU), a digital signal processor (DSP), a microprocessor, a controller, a chip, a microchip, an integrated circuit (IC), or any other suitable multi-purpose or specific processor or controller. Monitoring modules 120 and 121, computer processors 130 and 131, and analysis modules 140 and 141, may each retrieve and/or store data and/or execute software according to computer code stored in one or more internal or external memory unit(s). Memory unit(s) may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 5:
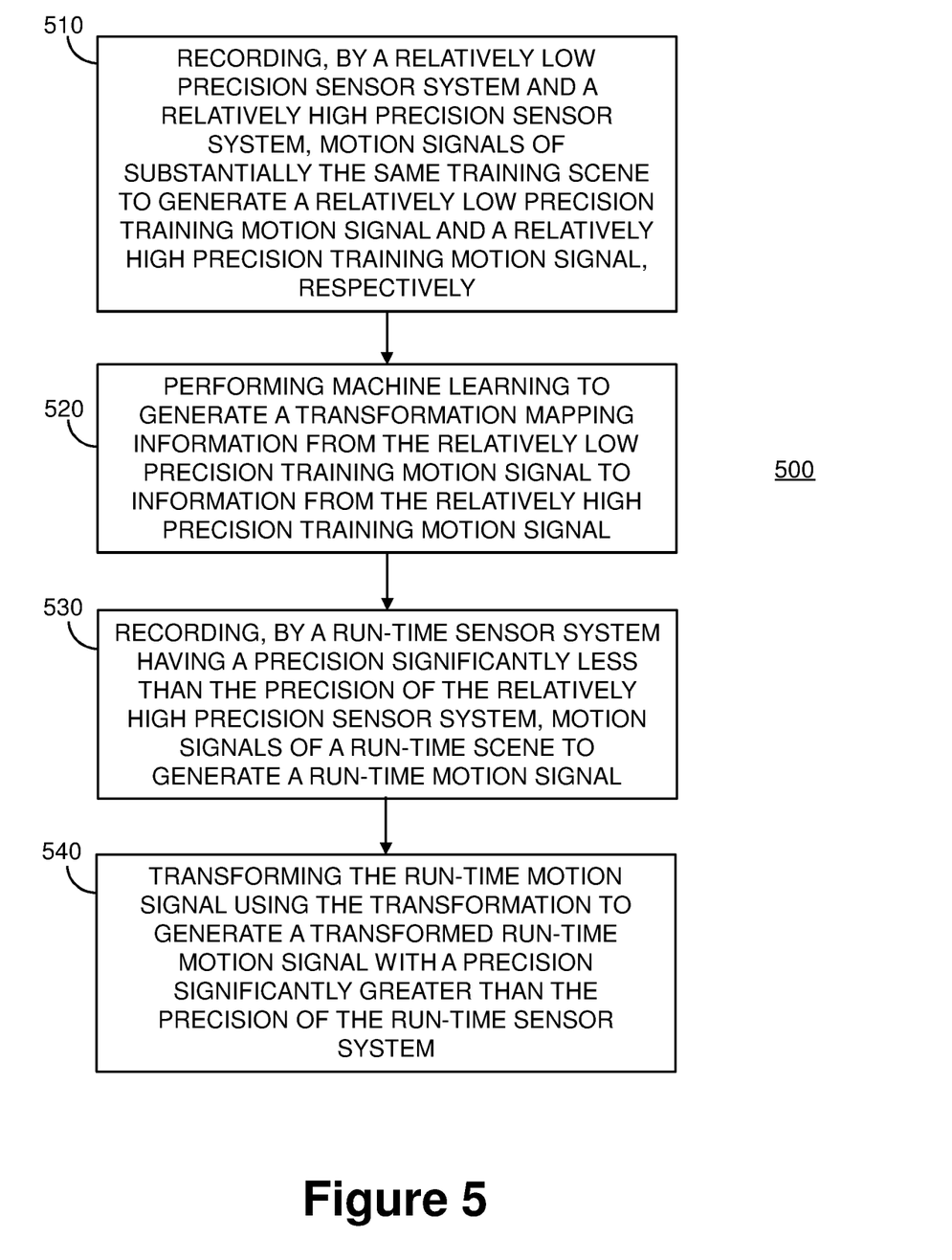
FIG. 5 is a flowchart of a method in accordance with some embodiments of the invention.

Reference is made to FIG. 5, which is a flowchart of a method 500 in accordance with some embodiments of the invention. Training phase operations of method 500 may be executed by computer processor 130 of system 100 of FIG. 1A and run-time phase operations of method 500 may be executed by computer processor 131 of system 101 of FIG. 1B. Method 500 may be executed upon a request or command that is issued by a user, or automatically issued by another application.

In training phase operation 510, a relatively low precision sensor system (e.g., 110B of FIG. 1A) and a relatively high precision sensor system (e.g., 110A of FIG. 1A) may record a relatively low precision training motion signal and a relatively high precision training motion signal, respectively, of substantially the same training scene (e.g., tracking the same target object, such as 210 and 310 of FIGS. 2-3).

In some embodiments, the relatively low precision sensor system comprises one or a plurality of (M) sensors and the relatively high precision sensor system comprises a plurality of (N) sensors, wherein the number (N) is greater than the number (M), wherein the plurality of (N) sensors are configured to operate collectively produce an aggregated motion signal that has a higher cumulative precision than a precision of an aggregated motion signal produced by the one or plurality of (M) sensors.

In one embodiment, the relatively low precision sensor system and relatively high precision sensor system are mounted on a same object as, and move together with, a target object being tracked in the recorded scene. In another embodiment, the relatively low precision sensor system and relatively high precision sensor system are mounted externally from, and move independently of, a target object being tracked in the recorded scene. In another embodiment, one of the relatively low precision sensor system and relatively high precision sensor system is mounted on a same object as, and moves together with, a target object being tracked in the recorded scene, and the other one of the relatively low precision sensor system and relatively high precision sensor system is mounted externally from, and moves independently of, the target object being tracked in the recorded scene. In another embodiment, the relatively low precision sensor system or relatively high precision sensor system includes both a sensor that are both mounted on a same object as, and moves together with, a target object being tracked in the recorded scene, and a sensor that are mounted externally from, and moves independently of, the target object being tracked in the recorded scene.

In one embodiment, the relatively low precision sensor system and relatively high precision sensor system record motion of substantially the same target object simultaneously. In one embodiment, the relatively low precision sensor system and relatively high precision sensor system record repeated iterations of motion of substantially the same target object at different times or places.

In training phase operation 520, one or more processors (e.g., computer processor 130 of FIG. 1A) are configured to generate a transformation (e.g., transformation 150 of FIG. 1A) mapping information from the relatively low precision training motion signal to information from the relatively high precision training motion signal. The one or more processors may train a neural network that inputs pairs of corresponding information of substantially the same training scene from the relatively low precision training motion signal and from the relatively high precision training motion signal, and generates the transformation by transforming the information from the relatively low precision training motion signal into a transformed motion signal optimized to match the corresponding information from the relatively high precision training motion signal.

In some embodiments, the relatively low precision sensor system and the relatively high precision sensor system measure motion signals for different points in space or using different coordinate systems, and the one or more processors may train a second transformation in operation 520 to map the motion signals for the different points in space or different coordinate systems to motion signals for a common point in space or a common coordinate system.

In some embodiments, the relatively low precision training motion signal and the relatively high precision training motion signal have different types of motion information, wherein the one or more processors may perform machine learning in operation 520 by generating a transformation mapping information of the type of the relatively low precision training motion signal to information of the type of the relatively high precision training motion signal.

In run-time phase operation 530, one or more processors (e.g., computer processor 131 of FIG. 1B) are configured to record, by a run-time sensor system (e.g., 111B of FIG. 1B) having a precision significantly less than the precision of the relatively high precision sensor system (e.g., approximately equal to or on the order of the precision of the relatively low precision sensor system), motion signals of a run-time scene to generate a run-time motion signal.

In run-time phase operation 530, one or more processors (e.g., computer processor 131 of FIG. 1B) are configured to transform the run-time motion signal using the transformation to generate a transformed run-time motion signal with a precision significantly greater than the precision of the run-time sensor system (e.g., approximately equal to or on the order of the precision of the relatively high precision training motion signal).

In the run-time phase, one or more processors (e.g., computer processor 131 of FIG. 1B) are configured to render a virtual object in augmented or virtual reality glasses according to the transformed run-time motion signal.

Other operations or orders of operations may be performed.

According to some embodiments of the present invention, a system (e.g., system 100 of FIG. 1A) operating one or more processors (e.g., computer processor 130 of FIG. 1A) or method (e.g., method 500 of FIG. 5) may collect measurements from a first object localization system (e.g., 110A of FIG. 1A) and from a second object localization system (e.g., 110B of FIG. 1A) (simultaneously or at separate times), wherein the first object localization system is more precise than the second object localization system, while the first and the second object localization systems obtain object localization data of a common object (e.g., target object 210 of FIG. 2); monitor operational data characterizing an operation of the first and second object localization systems; and generate a model, transformation, or reciprocal function, based on the operation of the first and the second object localization system, that when applied to the second object localization system, improves the precision of the operation of the second object localization system, for example, to achieve precision equal to or approximately equal to (within 10% of) the precision of the first object localization system.

According to some embodiments of the present invention, the transformation may be applied to an object localization system similar to the second object localization system.

According to some embodiments of the present invention, the common object comprises a rig and wherein the object localization systems are configured to obtain at least a relative position and/or orientation of the rig.

According to some embodiments of the present invention, the first object localization system is at least partially external to the common object and wherein the second object localization system is mounted or physically attached to the common object (e.g., as shown in FIG. 2).

According to some embodiments of the present invention, the first and second object localization systems are both mounted or physically attached to the common object (e.g., as shown in FIG. 3).

According to some embodiments of the present invention, the object localization systems or sensors comprise an image capturing system such as a camera, an inertial measurement unit (IMU), a depth sensor, an acoustic sensor, or a combination thereof, and a computational device comprising one or more processor(s) and one or more memory unit(s) to input raw sensor data and output motion information (e.g., a 6DOF signal).

According to some embodiments of the present invention, the first object localization system comprises a plurality of discrete sensors (N) and averages or aggregates their sensor measurements to achieve the relatively higher precision than the second object localization system, which comprises a single sensor or a fewer number (M) of sensors (M<N) than does the first object localization system (e.g., as shown in FIG. 4).

Embodiments of the invention referring to a "dual-precision" sensor system may refer to a system generating data having at least two precisions, including systems that generate data having more than two precisions (e.g., an N-precision sensor system, where N is any integer 3, 4, . . . ). In some embodiments, individual sensors may have different precisions, while additionally or alternatively, individual sensors may have the same precisions, but their motion signal data is aggregated to for one or more groups of sensors which operate collectively to have different cumulative precisions.

Embodiments of the invention are not limited to AR, VR or MR and the motion detection system, device and method may be applied to any motion detection technology, such as autonomous driving, robotics motion, drone navigation, assistance to the blind, motion capture for the entertainment industry (e.g., creating a realistic model for games/animations/etc.), physical rehabilitation, etc.

In some embodiments, "approximately" may mean within 10% of, and "significantly" may mean at least 15% or 25% of, an amount being compared. Other amounts may be used.

In order to implement a method according to some embodiments of the invention, a computer processor may receive instructions and data from a read-only memory or a random access memory or both. At least one of aforementioned method steps is performed by at least one processor associated with a computer (e.g., computer processor 130 of FIG. 1A). The computer may also include, or be operatively coupled to communicate with, one or more storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

While the invention has been described with respect to a limited number of embodiments, these should not be construed as limitations on the scope of the invention, but rather as exemplifications of some of the preferred embodiments.

Other possible variations, modifications, and applications are also within the scope of the invention. Accordingly, the scope of the invention should not be limited by what has thus far been described, but by the appended claims and their legal equivalents.

The invention claimed is:

1. A method for improving sensor precision, the method comprising:
in a training phase, executed by a dual-precision sensor system:
recording, by a relatively low precision sensor system and a relatively high precision sensor system, motion signals of substantially the same training scene to generate a relatively low precision training motion signal and a relatively high precision training motion signal, respectively;
performing machine learning to generate a transformation mapping information from the relatively low precision training motion signal to information from the relatively high precision training motion signal;
in a run-time phase, executed by a run-time sensor system:
recording, by a run-time sensor system having a precision significantly less than the precision of the relatively high precision sensor system, motion signals of a run-time scene to generate a run-time motion signal; and
transforming the run-time motion signal having precision significantly less than the precision of the relatively high precision sensor system, using the transformation, to generate a transformed run-time motion signal with improved precision significantly greater than the precision of the run-time sensor system without using the relatively high precision sensor system.

2. The method of claim 1 comprising rendering a virtual object in augmented or virtual reality glasses according to the transformed run-time motion signal.

3. The method of claim 1 comprising training a neural network that inputs pairs of corresponding information of substantially the same training scene from the relatively low precision training motion signal and from the relatively high precision training motion signal, and generating the transformation by transforming the information from the relatively low precision training motion signal into a transformed motion signal optimized to match the corresponding information from the relatively high precision training motion signal.

4. The method of claim 1, wherein the relatively low precision sensor system and the relatively high precision sensor system measure motion signals for different points in space or using different coordinate systems, and comprising training a second transformation to map the motion signals for the different points in space or different coordinate systems to motion signals for a common point in space or a common coordinate system.

5. The method of claim 1 wherein the relatively low precision sensor system and relatively high precision sensor system are mounted on a same object as, and move together with, a target object being tracked in the recorded scene.

6. The method of claim 1 wherein the relatively low precision sensor system and relatively high precision sensor system are mounted externally from, and move independently of, a target object being tracked in the recorded scene.

7. The method of claim 1 wherein one of the relatively low precision sensor system and relatively high precision sensor system is mounted on a same object as, and moves together with, a target object being tracked in the recorded scene, and the other one of the relatively low precision sensor system and relatively high precision sensor system is mounted externally from, and moves independently of, the target object being tracked in the recorded scene.

8. The method of claim 1 wherein the relatively low precision sensor system or relatively high precision sensor system includes both a sensor that are both mounted on a same object as, and moves together with, a target object being tracked in the recorded scene, and a sensor that are mounted externally from, and moves independently of, the target object being tracked in the recorded scene.

9. The method of claim 1 wherein the relatively low precision sensor system comprises one or a plurality of (M) sensors and the relatively high precision sensor system comprises a plurality of (N) sensors, wherein the number (N) is greater than the number (M), wherein the plurality of (N) sensors are configured to operate collectively produce an aggregated motion signal that has a higher cumulative precision than a precision of an aggregated motion signal produced by the one or plurality of (M) sensors.

10. The method of claim 1 wherein the relatively low precision sensor system and relatively high precision sensor system record motion of substantially the same target object simultaneously.

11. The method of claim 1 wherein the relatively low precision sensor system and relatively high precision sensor system record repeated iterations of motion of substantially the same target object at different times or places.

12. The method of claim 1 wherein the relatively low precision training motion signal and the relatively high precision training motion signal have different types of motion information, wherein said machine learning generates a transformation mapping information of the type of the relatively low precision training motion signal to information of the type of the relatively high precision training motion signal.

13. The method of claim 1 wherein each of the relatively low precision training motion signal and the relatively high precision training motion signal is real data measured by one or more sensors or synthetic data simulated on a computer.

14. A dual-precision sensor system comprising:
a relatively low precision sensor system;
a relatively high precision sensor system; and
one or more processors configured to train a precision-improving transformation:
wherein, in a training phase:
the relatively low precision sensor system and the relatively high precision sensor system are configured to record motion signals of substantially the same target object to generate a relatively low precision training motion signal and a relatively high precision training motion signal, respectively; and
the one or more processors are configured to perform machine learning to generate a transformation mapping information from the relatively low precision training motion signal to information from the relatively high precision training motion signal;
wherein when the transformation is applied to a run-time motion signal recorded by a run-time sensor system having a precision significantly less than the precision of the relatively high precision sensor system, a transformed run-time motion signal is produced with improved precision significantly greater than the precision of the run-time sensor system without using the relatively high precision sensor system.

15. The system according to claim 14, wherein the one or more processors are configured to perform machine learning by training a neural network that inputs pairs of corresponding information of substantially the same training scene from the relatively low precision training motion signal and from the relatively high precision training motion signal, and generating the transformation by transforming the information from the relatively low precision training motion signal into a transformed motion signal optimized to match the corresponding information from the relatively high precision training motion signal.

16. The system according to claim 14, wherein the relatively low precision sensor system and the relatively high precision sensor system measure motion signals for different points in space or using different coordinate systems, and wherein the one or more processors are configured to train a second transformation to map the motion signals for the different points in space or different coordinate systems to motion signals for a common point in space or a common coordinate system.

17. The system according to claim 14, wherein the relatively low precision training motion signal and the relatively high precision training motion signal have different types of motion information, wherein the one or more processors are configured to perform machine learning by generating a transformation mapping information of the type of the relatively low precision training motion signal to information of the type of the relatively high precision training motion signal.

18. A sensor system comprising:
one or more memory units configured to store a transformation mapping information from a relatively low precision training motion signal recorded by a relatively low precision sensor system to information from a relatively high precision training motion signal recorded by a relatively high precision sensor system;
a run-time sensor system configured to record run-time motion signals, wherein the run-time sensor system has a precision significantly less than the precision of the relatively high precision sensors; and
one or more processor configured to transform the run-time motion signal having precision significantly less than the precision of the relatively high precision sensor system, using the stored transformation, to generate a transformed run-time motion signal with improved precision greater than the precision of the run-time sensors without using the relatively high precision sensor system.

19. The system according to claim 18, wherein each sensor system includes one or more sensors selected from the group consisting of: an image capturing system, an inertial measurement unit (IMU), a depth sensor, and an acoustic sensor.

20. The system according to claim 18 comprising augmented or virtual reality glasses configured to render a virtual object according to the transformed run-time motion signal.

21. The system according to claim 18, wherein the relatively low precision sensor system and relatively high precision sensor system are mounted on a same object as, and move together with, a target object being tracked in the recorded scene.

22. The system according to claim 18, wherein the relatively low precision sensor system and relatively high precision sensor system are mounted externally from, and move independently of, a target object being tracked in the recorded scene.

23. The system according to claim 18, wherein one of the relatively low precision sensor system and relatively high precision sensor system is mounted on a same object as, and moves together with, a target object being tracked in the recorded scene, and the other one of the relatively low precision sensor system and relatively high precision sensor system is mounted externally from, and moves independently of, the target object being tracked in the recorded scene.

24. The system according to claim 18, wherein the relatively low precision sensor system or relatively high precision sensor system includes both a sensor that are both mounted on a same object as, and moves together with, a target object being tracked in the recorded scene, and a sensor that are mounted externally from, and moves independently of, the target object being tracked in the recorded scene.

25. The system according to claim 18, wherein the relatively low precision sensor system comprises one or a plurality of (M) sensors and the relatively high precision sensor system comprises a plurality of (N) sensors, wherein the number (N) is greater than the number (M), wherein the plurality of (N) sensors are configured to operate collectively produce an aggregated motion signal that has a higher cumulative precision than a precision of an aggregated motion signal produced by the one or plurality of (M) sensors.

26. The system according to claim 18, wherein the relatively low precision sensor system and relatively high precision sensor system record motion of substantially the same target object simultaneously.

27. The system according to claim 18, wherein the relatively low precision sensor system and relatively high precision sensor system record repeated iterations of motion of substantially the same target object at different times or places.

28. The system according to claim 18, wherein each of the relatively low precision training motion signal and the relatively high precision training motion signal is real data measured by one or more sensors or synthetic data simulated on a computer.

29. The method of claim 1, wherein the run-time motion signal recorded by the run-time sensor system having a precision significantly less than the precision of the relatively high precision sensor system is transformed to have a precision approximately equal to or on the order of the precision of the relatively high precision training motion signal recorded by the relatively high precision sensor system.

* * * * *